United States Patent [19]
Platt

[11] Patent Number: 5,937,789
[45] Date of Patent: Aug. 17, 1999

[54] ANIMAL IDENTIFICATION DEVICE FOR ORAL ADMINISTRATION

[75] Inventor: James Edward Platt, Pinkenba, Australia

[73] Assignees: SEPR Australia Pty. Ltd., Queensland, Australia; Societe Europeene des Produits Refractaires, Paris, France

[21] Appl. No.: 08/981,886

[22] PCT Filed: Jul. 8, 1996

[86] PCT No.: PCT/AU96/00422

§ 371 Date: Jan. 5, 1998

§ 102(e) Date: Jan. 5, 1998

[87] PCT Pub. No.: WO97/01957

PCT Pub. Date: Jan. 23, 1997

[30] Foreign Application Priority Data

Jul. 6, 1995 [AU] Australia ............................... PN 4019

[51] Int. Cl.⁶ .................................................. A01K 29/00
[52] U.S. Cl. ............................................................ 119/174
[58] Field of Search ...................... 119/908, 174, 119/215; 128/899, 631, 903, 718

[56] References Cited

U.S. PATENT DOCUMENTS

| | | | |
|---|---|---|---|
| 3,415,225 | 12/1968 | Collier | 119/174 |
| 3,548,785 | 12/1970 | Cooper | 119/174 |
| 3,696,787 | 10/1972 | Coooper | 119/174 |
| 4,262,632 | 4/1981 | Hanton et al. | |
| 5,482,008 | 1/1996 | Stafford et al. | 119/174 |
| 5,697,384 | 12/1997 | Miyawaki et al. | 128/899 |
| 5,709,225 | 1/1998 | Budgifvars | 128/899 |
| 5,861,018 | 1/1999 | Feierbach | 128/899 |

FOREIGN PATENT DOCUMENTS

| | | |
|---|---|---|
| A 52584/90 | 10/1990 | Australia . |
| B 50687/93 | 5/1994 | Australia . |
| A 63038/94 | 11/1994 | Australia . |
| 646313 A1 | 4/1995 | European Pat. Off. . |
| 4317340 A1 | 12/1994 | Germany . |
| 8303599 | 5/1993 | South Africa . |
| WO 89/01722 | 2/1989 | WIPO . |
| WO 93/05648 | 4/1993 | WIPO . |
| WO 95/17809 | 7/1995 | WIPO . |

OTHER PUBLICATIONS

Derwent Abstract Accession No. 84–113905/18, Class P14, ZA, A, 8303599 (Electromatic Pty Ltd) Dec. 28, 1983 abstract.

*Primary Examiner*—Thomas Price
*Attorney, Agent, or Firm*—Panitch Schwarze Jacobs & Nadel, P.C.

[57] ABSTRACT

An animal identification device for oral administration and which resides in an animals stomach. The device has a substantially solid body which has a density of at least about 3 $gcm^{-3}$. The body comprises a substantially inert plastic material and filler which has a specific gravity of at least about 4.6. An electronic identification device is encapsulated in the body. A process for manufacturing the animal identification device, and a method identifying at least one animal by orally administrating the device is also disclosed.

14 Claims, No Drawings

ANIMAL IDENTIFICATION DEVICE FOR ORAL ADMINISTRATION

FIELD OF THE INVENTION

The present invention relates to an identification device for animals, and in particular ruminant animals.

BACKGROUND ART

Domestic animals such as sheep and cattle are generally marked in some manner to allow the animal to be identified. Traditionally, cattle have been branded by a hot iron. This method is time-consuming and brands are subject to wear, damage or alteration. Ear tagging is another commonly used method. However, tags are often lost or damaged during the lifetime of the animal. They are also not security proof and may be replaced or altered by a third party.

More recently, microchips have been implanted under the animal's skin, normally behind the ear. A disadvantage of this system is that the microchip may contaminate food products obtained from the slaughtered animal. Further, implantation must normally be conducted by a suitably skilled person.

A further proposal for identifying animals has been described in Australian Patent No. 649,212. This patent describes a device having a ceramic housing with a transponder located therein. The capsule is administered by mouth and settles in the stomach. The housing is sealed by a cap. The cap is magnetic to allow post-slaughter location of the device.

One disadvantage of the ceramic capsules is that they are relatively time-consuming and costly to manufacture. First, the ceramic housing must be prepared by conventional ceramic techniques such as shaping a powder, mixing and sintering at high temperatures. The transponder is then placed inside the capsule and in a further step the capsule is sealed by the cap. Alternatively, the transponder may be glued to the ceramic capsule. In either case, it is possible for the cap or the transponder to become dislodged from the capsule. Once dislodged, they are subject to loss from the animal.

Further, in order for the capsule to remain a viable means of identifying the animal it must remain in the stomach for an extended period and preferably for the lifetime of the animal. Capsules may be lost through regurgitation or may be passed from the animal. It has been found that the ceramic capsules as described in Australian Patent No. 649,212 may be lost in this manner.

SUMMARY OF THE INVENTION

It is an object of the invention to provide an animal identification device which may at least partially overcome some of the above disadvantages or provide the public with a useful choice.

The present invention relates to the unexpected and surprising discovery that capsules having a relatively high density may be prepared in an essentially one step process by encapsulating a transponder or the like in a body prepared from a plastics material and a relatively dense filler.

According to a first embodiment of the present invention, there is provided an animal identification device for oral administration and which in use resides in the animal's stomach, the device comprising a substantially solid body comprising a plastics material and a filler having a desired density, and electronic identifying means encapsulated within the body.

According to a second embodiment of the present invention, there is provided a process for manufacturing an animal identification device for oral administration, the process including;

providing an electronic identifying means, mixing a plastics material with a filler having a desired density, forming a substantially solid body from the plastics material and filler with the identifying means encapsulated therein.

According to a third embodiment of the present invention, there is provided a method of identifying at least one animal, the method comprising orally administering the device of the first embodiment into the animal's stomach and detecting the identification means.

DETAILED DESCRIPTION OF THE INVENTION

The device of the present invention may be used to identify any suitable animal. In particular, the device may be used to identify ruminants and includes cattle, sheep, goats, deer, buffalo and bison. Although the present invention is described in relation to domestic ruminants such as cattle, no limitation is intended thereby. The device of the present invention may be also be used in applications such as wildlife monitoring.

The device is suitable for oral administration. In ruminants the device will normally locate in the reticulum or second stomach. The size and weight of the device will of course differ with different sizes and types of animal. Preferably the device is sized and shaped to allow it to be administered easily. Dosing apparatus are often used to administer veterinary capsules to domestic animals. Preferably the device is sized to enable administration by such devices. The device comprises a substantially solid body formed from a plastics material which is filled with a material having a desired density. The plastics material may be any suitable material and is preferably substantially inert in the physiological conditions of the animal's stomach. If the animal is used for meat production, it is also preferred that the material has an authorisation for use with food products. The material may be ax thermoset such as epoxy resin, melamine-formaldehyde resin, phenol-formaldehyde resin, urea-formaldehyde resin, phenolic resins, silicones or polyesters. Thermoplastics such as polypropylene, polyethylene and copolymers or blends thereof may also be used.

The plastics material is filled with a material having a desired density. The presence of the filler enables the device to have a sufficiently high density so that the incidence of rejection may be minimised. The preferred density of the device may be different for different types of animal. It has been found that a density of about 3 $gcm^{-3}$ is suitable for cattle.

In most cases, the desired density of the filler may be selected on the basis of the specific gravity Preferably the fillers have a specific gravity of at least about 4.0 and most preferably at least about 4.6. Typically, the fillers are in particulate form. In some instances, where the particle size is extremely small, such as less than 10 micron, the bulk density may be quite low in relation to the specific gravity. In such cases, the specific gravity may not give a useful indication as to suitability of the material and the bulk density should be considered. This is known to the person skilled in the art of particulate materials.

Typical fillers include natural or synthetic mineral oxides based on silicon, zircon and aluminium. Such materials include natural zircon sand (zirconium silicate), baddeleyite (natural zirconium dioxide), fused zirconia, synthetic zirconium oxide, baryte (naturally occurring barium sulphate) or barium oxide. An especially preferred filler is zircon sand. The fillers are typically in particulate form. The particle size is preferably between about 40 and about 500 microns. Combinations of fillers having different particle sizes may also be used. The particle sizes are preferably selected so that the smaller grains at least partially fill cavities between the larger grains. In this manner the density of the device may further be controlled. In a preferred embodiment, two particle sizes are used the first being between about 40 to about 160 microns and the second being between 300 and 400 microns. Preferably the filler comprises about 5 to about 40% of the small particle size and about 95 to about 60% of the large particle size.

The relative amounts of plastics material and filler may be varied, depending on the specific gravity of the filler, the particle size distribution of the fillers used and the desired size and weight of the solid body. The body may comprise up to about 99 wt % filler. Preferably the density of the solid body is at least about 2.75 and preferably at least about 3.0 gcm$^{-3}$. Typically the body comprises between about 80 to about 95 wt % filler.

The plastics material may also comprise optional additives such as colouring agents, stabilisers, anti-oxidants and the like. Such additives are known to those skilled in the art.

The device of the present invention has an identification means encapsulated in the solid body. Such identification means are known. Typically the identification means is an electronic transponder. Such transponders may be active, in which case they carry their own power supply and transmit a radio signal which may be detected. Alternatively and preferably the transponder is passive and responds to a particular frequency. Preferably each transponder is uniquely coded at the point of manufacture such that each animal may be individually identified for life.

The present invention also relates to a process or making the animal identification devices. The body may be shaped or prepared from plastic material according to known methods. Preferably the plastics material is an epoxy. The epoxy may be either a one pack or a two pack. Typically, the filler is mixed with uncured epoxy and a hardener (if required) and the mix is placed into a mould. Suitable moulds may be made from teflon, polyurethane or polypropylene. The identification means is then inserted into the uncured or partially cured material and the epoxy is allowed to cure to provide a substantially solid body which encapsulates the identification means. Preferably curing is carried out at room temperature so that the identification means is not subject to high temperatures which may cause it to malfunction. (It is of course not possible to prepare the prior art ceramic capsules with the identification means in situ). Further the identification means cannot become separated from the final device as it is encapsulated within the body.

The present invention also relates to a method for identifying an animal. As previously described the devices is preferably sized to be combatable with known dosage apparatus. This enables the device to be easily administered by farm hands or the like and does not require specialist training as in the case of microchip implanting. Once administered the device locates in the stomach of the animal. Preferably the identification means is a passive transponder which may be detected by a suitable reading unit. Such units may be mounted to cattle races and loading ramps of the like and may automatically record the animal as it passes the unit.

BEST MODE

Capsules were prepared from an epoxy-based resin (bisphenal A/F which is available from CIBA Geigy, Melbourne, Australia), and a polyalkylamine hardener (also available from CIBA Geigy). The ratio of epoxy resin/ hardener was between 6–16% to provide a mix having a viscosity of 75–150 mPa.S.

Each capsule was prepared using two different fillers. The general procedure was as follows:

The two types of fillers were mixed for about 3–5 minutes.

The resin and hardener were mixed and the filler was then added.

The resulting composite was further mixed for up to 5 minutes and cast into a vibrating mould. A transponder was inserted into the composite and the resulting hole backfilled. The moulds were allowed to cure at roam temperature for about 6 hours or heated to 50–70% to use in about 2–3 hours. The capsules were then removed from the moulds. The capsules were cylindrical in shape with a length of about 60 mm and a diameter of about 19.8 mm.

Capsules were prepared according to the following

Trial Set 1

6.6 parts by weight epoxy resin (specific gravity 1.1) and 2.2 parts by weight hardener (specific gravity 0.76) were mixed with various fillers (parts by weight) according to the following Table:

| TRIAL | ZIRCON SAND | ZIRCON SAND | BADDEL- EYITE | BARYTE | FUSED ZIRCONIA | CAPSULE WT GRAMS |
|---|---|---|---|---|---|---|
| SG | 4.6 | 4.6 | 5.7 | 4.3 | 6.1 | |
| PS | 200–300 | 40–160 | 80–120 | 40–500 | 200–300 | |
| 1 | 32.34 | 13.86 | | | | 55 |
| 2 | | 5.54 | 40.66 | | | 57 |
| 3 | 16.17 | | | | 30.03 | 56 |
| 4 | | | 18.48 | | 27.72 | 58 |
| 5 | | 13.86 | | 32.34 | | 57 |

SG = Specific Gravity
PS = Particle Size/Microns

Trial Set 2

2.48 parts by weight epoxy resin and 0.825 by weight hardener were mixed with various fillers according to the following Table:

| TRIAL | ZIRCON SAND | ZIRCON SAND | BADDEL-EYITE | BARYTE | FUSED ZIRCONIA | CAPSULE WT GRAMS |
|---|---|---|---|---|---|---|
| SG | 4.6 | 4.6 | 5.7 | 4.3 | 6.1 | |
| PS | 200–300 | 40–160 | 80–120 | 40–500 | 200–300 | |
| 6 | 49.1 | 2.58 | | | | 55 |
| 7 | | 2.09 | 49.63 | | | 57 |
| 8 | 10.34 | | | | 41.36 | 56 |
| 9 | | | 15.51 | | 36.19 | 58 |
| 10 | | 2.58 | | 49.1 | | 57 |

SG = Specific Gravity
PS = Particle Size/Microns

The above capsules have an average density of about 3. This density is sufficient for the capsules to remain substantially indefinitely in the stomach of a cow to which it has been administered.

It can be seen that the device of the present invention may be made without the need to provide caps or other sealing means. The identification means is encapsulated and held in place within the body. Thus the identification means cannot be separated from the device and lost.

I claim:

1. A substantially solid animal identification device for oral administration and which in use resides in the animal's stomach, the device comprising a plastics material and a particulate filler having a desired density, and electronic identifying means encapsulated within the device.

2. The device of claim 1 wherein the filler is selected from the group comprising zircon sand, baddeleyite, baryte and fused zirconia.

3. The device of claim 2 wherein the filler comprises zircon sand.

4. The device of claim 1 wherein the filler has a particle size of about 40 to about 500 $\mu$m.

5. The device of claim 4 wherein the filler comprises a mix of a first filler having a particle size of about 40–160 micron and a second filler having a particle size of about 200 to about 300 micron.

6. The device of claim 5 wherein the filler comprises about 5–40% of the first filler and about 60–95% of the second filler.

7. The device of claim 4 wherein the filler has a specific gravity of more than about 4.6 $\text{gcm}^{-3}$.

8. The device of claim 1 wherein the device comprises about 40 to about 10% by weight of the plastics material.

9. The device of claim 1 wherein the plastics material comprises an epoxy resin.

10. The device of claim 1 wherein the device has a density of at least about 3 $\text{gcm}^{-3}$.

11. The device or claim 1 wherein the identifying means is a passive transponder.

12. A method of identifying at least one animal, the method comprising orally administering the device of claim 1 into the animal's stomach and detecting the identification means.

13. A process for manufacturing an animal identification device for oral administration, the process including;
   providing an electronic identifying means,
   mixing a plastics material with a filler having a desired density,
   forming a substantially solid body from the plastics material and filler with the identifying means encapsulated therein.

14. A substantially solid animal identification device having a specific gravity of at least 3 $\text{gcm}^{-3}$, comprising 40–10% by weight of an epoxy material and 90–60% by weight of particulate filler, which filler has a specific gravity of at least 4.6 $\text{gcm}^{-3}$ and a particle size of between 40 to about 500 $\mu$m.

* * * * *